United States Patent [19]

Ban

[11] Patent Number: 5,775,492
[45] Date of Patent: Jul. 7, 1998

[54] CARD FOR MAILING A PRODUCT

[75] Inventor: Ichiro Ban, Osaka, Japan

[73] Assignee: Ban PR Kabushiki Kaisha, Osaka, Japan

[21] Appl. No.: 755,675

[22] Filed: Nov. 25, 1996

Related U.S. Application Data

[63] Continuation-in-part of Ser. No. 501,882, Jul. 13, 1995, abandoned.

[30] Foreign Application Priority Data

Jun. 30, 1995 [JP] Japan ................................ 7-165330
Jan. 16, 1996 [JP] Japan ................................ 8-005029

[51] Int. Cl.[6] .................................................. B65D 85/57
[52] U.S. Cl. .................... 206/308.1; 206/313; 229/92.8
[58] Field of Search ........................... 206/308.1, 309, 206/310, 312, 311, 313, 232; 229/72, 92.8; 40/340

[56] References Cited

U.S. PATENT DOCUMENTS

| | | | |
|---|---|---|---|
| 1,399,757 | 12/1921 | Emerson | 40/340 |
| 2,519,390 | 8/1950 | McCulloh | 229/92.8 |
| 3,122,053 | 2/1964 | Dimitracopoulos | 40/340 |
| 3,430,761 | 3/1969 | Pelkey | 206/309 |
| 4,742,954 | 5/1988 | Shishido | 229/92.8 |
| 5,090,561 | 2/1992 | Spector | 206/313 |
| 5,600,628 | 2/1997 | Spector | 206/308.1 |

FOREIGN PATENT DOCUMENTS

| | | | |
|---|---|---|---|
| 205890 | 2/1957 | Australia | 40/340 |
| 341146 | 1/1931 | United Kingdom | 40/340 |

*Primary Examiner*—Paul T. Sewell
*Assistant Examiner*—Luan K. Bui
*Attorney, Agent, or Firm*—Edwin E. Greigg; Ronald E. Greigg

[57] ABSTRACT

The invention relates to a card for mailing a storage disc economically and safely. The card comprises a coupling part on one side of a postal card-sized board to firmly fix a storage disc via a hooking means, and on the opposite side a communication entry part is provided to write down messages. At least one sealing sheet is employed to cover one side of the board and its entire rim is adhered on the board.

15 Claims, 9 Drawing Sheets

CARD FOR MAILING A PRODUCT

This application is a continuation-in-part of application Ser. No. 08/501,882 filed Jul. 13, 1995 now abandoned.

FIELD OF THE INVENTION

The present invention relates to a card which enables a person to mail a detachable disc-shaped storage media, such as a compact disc and a floppy disc, at low cost.

PRIOR ART

Figure 10:
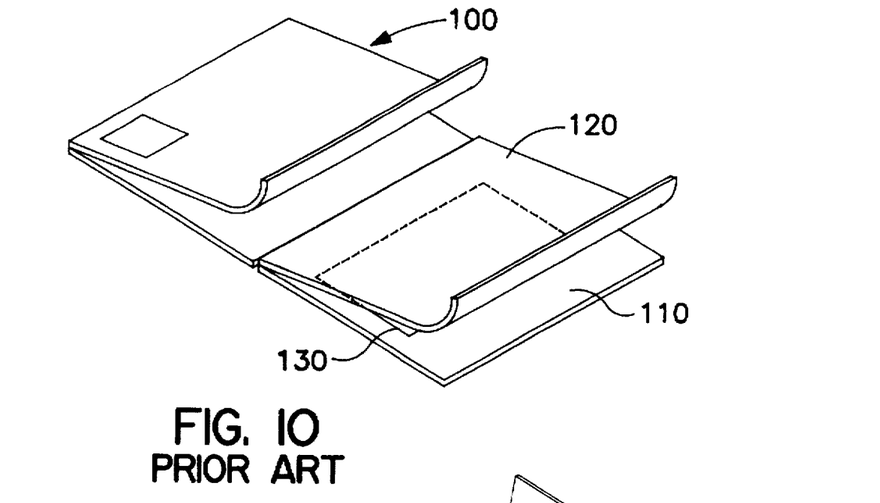
FIG. 10 is a perspective exploded view of a conventional jacket for a small-sized compact disc.

The Japanese publication No. 03-386 has disclosed a postal card which is enabled to mail a variety of thin cards, such as a telephone card. FIG. 10 shows a postal card 100 disclosed in the above-mentioned publication. The postal card 100 is composed of a postal card-sized board 110 and a sealing sheet 120 of the size equivalent to the lower half of the board 110.

According to the above-mentioned postal card, one edge of the sealing sheet 120 is adhered to the postal card-sized board 110. After the telephone card 130 is sandwiched between the board 110 and the sheet 120, the sealing sheet 120 is designed to seal the lower half of the board 110.

And the upper half of the board 110 is allocated for a space to write down a postal address.

Figure 11:
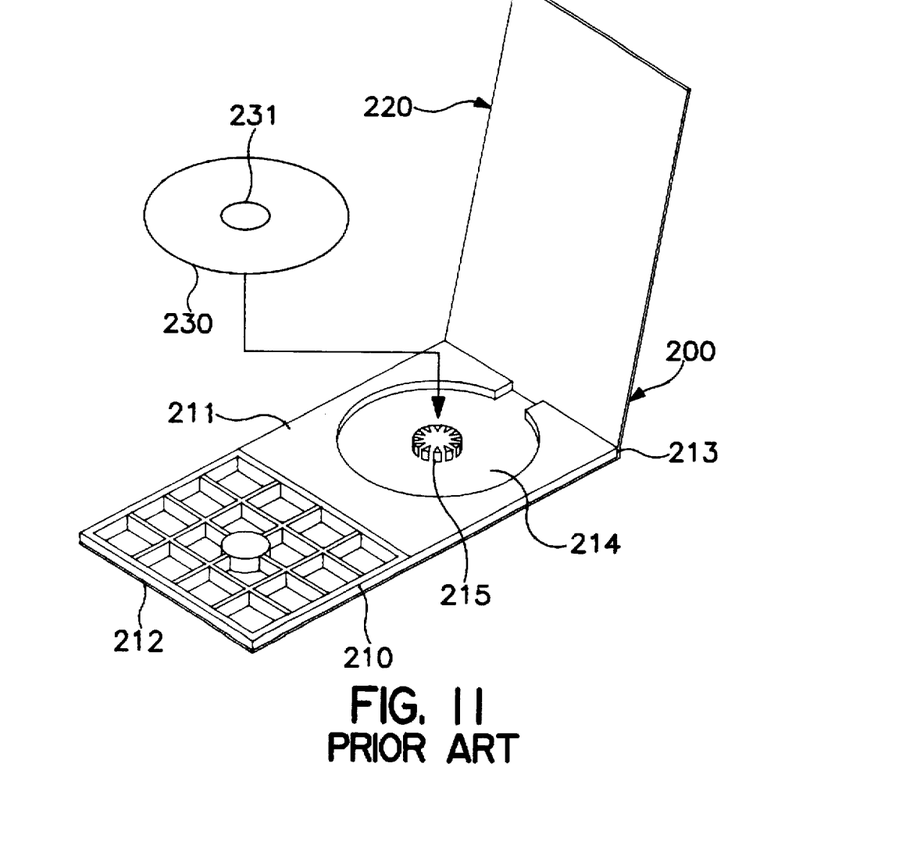
FIG. 11 illustrates a prior art mailing card.

FIG. 11 shows another example in which a 3.5-inch small-sized musical compact disc, hereinafter referred to as MD, is enclosed in a jacket 200. The jacket is then wrapped in a plastic bag for sale.

In this example, the jacket 200 is composed of a board 210 of given size and thickness, and a cover sheet 220 which is designed to cover the front side 211 of the board 210, its back side 212 and the board's one end 213.

In this embodiment, a coupling part 214, a shallow cylindrical space almost the same size as an MD230, is provided on the front side 211 of the board 210. And a hooking means 215 is mounted at the center of the coupling part 214 in order to fix the MD230 firmly into the coupling part 214 by hooking a spindle hole 231 of the MD230.

Furthermore, the cover sheet 220 is either stuck or glued to the board's back side 212 (and occasionally, to board's one end 313 as well), but the board's front side 211 remains lose so that it is openable.

In order to mail this jacket 200 together with an MD230, the jacket 200 either with or without the plastic bag is usually stuffed into an envelop.

The postal card 100 revealed in the Japanese laid-open publication No. 03-386 may be suitable to enclose a relatively thin object, such as a telephone card 130. But it is not applicable to mail thicker objects, such as a sheet and a storage disc. In mailing such an object measuring 1 to 2 mm thick, for example, the area of the sealing sheet 120 where the object is enclosed bulges due to the thickness of the enclosed object, making the sealing sheet 120 liable to rip open in the mail. If that happens, by the time the mail reaches the addressee, the enclosed object, i.e. a sheet or a storage disc, may end up missing.

Therefore, the method disclosed in the prior art has not proven practical as a means to mail a storage disc, such as MD230.

It is possible to send an MD230 under cover after it is wrapped in a jacket 200 as shown in FIG. 10. But as postage for a sealed letter is higher than that for a postal card, it has not proven cost efficient to send MD230 in large numbers.

SUMMARY OF THE INVENTION

To overcome the disadvantages encountered in the prior art, it is an object of the present invention to provide a card which ensures a safe and economical way to mail a storage disc.

In order to achieve the above-mentioned objectives, the present invention is characterized by the following structure.

A coupling part 3, a shallow cylindrical space almost the same size and thickness as a storage disc 2, is provided on one side of the board 1. On the other side of the board 1 is provided a communication entry part 5 to write various messages.

Preferably, one chooses the board 1 which is similar in size to that of an ordinary postal card, and thicker than a storage disc 2.

It is preferable to choose such materials for the board 1 as synthetic resin so that it is light enough to mail and at the same time strong enough to withstand rough handling during delivery.

The above coupling part 3 is patterned after the actual size of a storage disc 2. In other words, the coupling part 3 is to have a slightly larger diameter than the storage disc 2. And it is slightly deeper than the thickness of the disc.

The coupling part 3 can be of the same depth, but it is possible to mount an even deeper section inside the coupling part 3 to protect the disc's vulnerable memory storage area 3b from damages.

In order to prevent the storage disc from moving around inside the coupling part 3 during the delivery, it is recommended to mount a hooking means 3a to fix the storage disc firmly into the coupling part 3 by hooking a spindle hole 2a.

The hooking means 3a, having, for example, a plural number of erratic picks standing from the bottom of the coupling part 3, is provided to fix a storage disc 2 into the coupling part 3. These picks are supposed to press against the spindle hole 2a as the storage disc 2 is being inserted into the coupling part 3.

With this arrangement, the board 1 and the storage disc 2 are designed to form an evenly flat surface when the disc 2 is fixed into the coupling part 3 via hooking means 3a. Thus a sealing sheet 7, which will be described later, can easily spread over this side of the board 1.

In a preferable embodiment where a concave 3b is provided on the board 1 continuous to the coupling part 3, the storage disc 2 fixed firmly into the coupling part 3 can be easily detached. In yet another preferred embodiment, a cut 3d that runs across the board 1 continuous to the coupling part 3 can also be provided for the same function mentioned above.

It is desirable to make the above-mentioned board 1 as light as possible while retaining enough strength. Therefore, a concave 1b or a hole 1a is formed on the board 1 except for the area where the coupling part 3 is located.

Among the communication items to be contained in the communication entry part 5 on the board's back side are names of the music recorded in the storage disc, composer, song writer, conductor, player and singer; description relevant to the contents of the disc; and commercial messages, as well as the postal address.

These messages can not only be handwritten, printed, or stamped directly on the board 1, but they may also be written and/or printed on a seal. This seal is then pasted on the communication entry part 5.

This communication entry part 5 may be directly printed on the flat surface of the board's back side. A back sheet 6, with the communication entry part 5 printed on its surface, may be adhered on the board's back side. In case of using a transparent back sheet 6, messages can be printed on the inner side of the sheet.

According to the present invention, a sealing sheet 7 is employed to seal one side of the board 1 after the disc is fixed into the coupling part 3 and the sheet's entire rim is adhered to the board 1.

Then postal addresses can be written in the communication entry part 5. Another alternative would be using an address stamp and/or pasting a pre-printed address seal.

With the above-mentioned method, a postal card with a detachable storage disc 2 can be mailed at the postage for a postal card, which is much cheaper than mailing it under cover. It has another advantage. It helps save time by eliminating the work of stuffing envelops.

Furthermore, because the storage disc 2 and the board 1 form an evenly flat surface when the disc is fixed into the coupling part 3, the sealing sheet 7 covering the board 1 automatically form a flat surface. This will ensure the safe mailing of the storage disc as a bulging part doesn't appear in the sheet and is unlikely to rip up in the mail.

The methods to adhere the sealing sheet 7 to the board 1 are optional and can be chosen from sticking, gluing and melting. There are, however, setbacks in adopting a sticking method, that is, a sealing sheet 7 is apt to peel off in the mail. If this happens the data contained in the storage disc 2 can be easily stolen by someone who removes the disc 2 during the mail, downloads the data, returns the disc back to the original position and then seals up again. To an unsuspecting recipient, the card looks perfectly normal, with no trace of illegality. To protect the confidentiality of the content of the storage disc 2, it is advisable to adopt either a gluing or a melting method. These methods are more advantageous than a sticking method in that a sealing sheet 7 won't peel off easily from the board 1. In addition, a sealing sheet will not be restored to its original state once it should come off.

A sticking method is not economical either, especially when a transparent sealing sheet made of synthetic resin is employed.

Unlike a sticking method in which a storage disc 2 can be easily detached from a card by peeling off the sealing sheet 7, a gluing method or a melting method makes it necessary to remove a part of or all of the sealing sheet 7 in order to detach the storage disc 2, or to open the part of the sealing sheet 7 corresponding to the coupling part 3, hereinafter referred to as an opening part.

In order to remove the opening part 7a entirely, for example, encircle the part with a break line 7b. This break line 7b can come in various forms—perforation, tear string to tear strip. Combination of the above variations is another option.

In order to create an openable opening part 7a, for example, encircle this part with a folding line 7c and a break line 7b. A recipient of the card can open this opening part 7a by ripping the break line 7b and then folding the opening part 7a on a folding line 7c.

The opening part 7a needs to include the area that corresponds to the coupling part 3. The size of this opening part 7a, therefore, can be flexible. In other words, it can be as small as the size of the coupling part 3, or as large as that of the sealing sheet 7. In any case, a recipient of the card can remove or open the opening part 7a by ripping off the break line 7b formed along the opening part 7a.

To help remove or open this opening part 7a easily, it is better not to glue or melt this part on to any of the following parts, i.e. the board 1, the storage disc 2 and an inner sheet 10, details of which is explained later. However, the opening part 7a may be stuck on the above parts without any problems.

In applying the sticking method, however, it is advisable to use an adhesive that can stick only once and never be used again so that the recipient can detect whether or not someone had opened the card without permission during the mail.

Anybody attempting to take out the storage disc 2 from the board 1, needs to rip up a break line 7b. Therefore, the condition of the break line 7b shows whether a fraudulent usage of the data has taken place or not. In other words, if the break line 7b remains unbroken at the time of arrival, the recipient can assume that the data wasn't stolen during the mailing. On the other hand, if the line is found ripped, it is possible someone has stolen the data on its way, so necessary measure can be taken immediately on the part of the recipient.

On the surface of the sealing sheet 7, a well-coordinated pattern may be printed to bring about the aesthetic value of the card itself.

Aside from such a pattern, names of the music, song writer, composer, conductor, player and singer; a catch phrase and commercial message can also be printed on the sealing sheet 7.

These messages can be usually printed on the surface of the sealing sheet 7. In case the sheet is transparent, they may be printed inside the sheet as well, which turns out to be advantageous as the printed messages can be protected during the delivery.

When the pattern on the sealing sheet 7 matches the design of the storage disc 2, it is expected to give a favorable impression to the recipient as he or she can recognize the long-awaited disc has come without ever opening it.

Once the opening part 7a is removed or opened, a portion of the board 1 and/or a storage disc 2 itself is exposed naked, which is not desirable from an aesthetic point of view. It would be especially an eyesore to have a concave 1b or a hole 1a exposed naked after the opening part 7a is removed. Same is true when a transparent sealing sheet is adopted.

According to the present invention, one or more than two inner sheet 8 are sandwiched between a board 1 and a sealing sheet 7. In order to enhance its aesthetic value, part of the inner sheet 8, which is also exposed after an opening part 7a is removed or opened, may have a matching pattern with a storage disc 2.

In order to gain a similar aesthetic effect with a transparent sealing sheet 7, part of the inner sheet 8 where one can see through from a transparent sheet can have a matching pattern with the storage disc 2.

The inner sheet 8 that covers one side of the board 1 entirely is designed in such a way that the storage disc 2 is taken out. In order to do so, two methods are available. One is to provide a hole 8a corresponding to the coupling part 3 on the inner sheet 8.

Another way is to make an openable section on the inner sheet 8, which is referred to as inner door 8b. This inner door 8b corresponds to the area where the opening part 7a is located.

In order to make an openable inner door 8b, encircle the inner door 8b with a folding line 8c, and either a cut line 8d or a break line. The inner door 8b may also be encircled with a folding line 8c and a notch 8e. A door 12 opens when the break line is ripped up.

If a plural numbers of inner sheet 8 with the inner doors 8b are mounted over the board 1, each inner door 8b may open in any direction. Size of each inner doors 8b can also vary.

On both sides of the inner doors 8b, a pattern, names of the songs, composer, song writer, conductor, music writer, player, singer, music, and words as well as explanation of the content may be printed. They may also be printed on the inner sheet 8 as part of the printed pattern rendered on the inner door 8b.

Materials to be used for the inner sheet 8b vary but recommended are synthetic resin and paper.

DESCRIPTION OF THE PREFERRED EMBODIMENT

Figure 1:
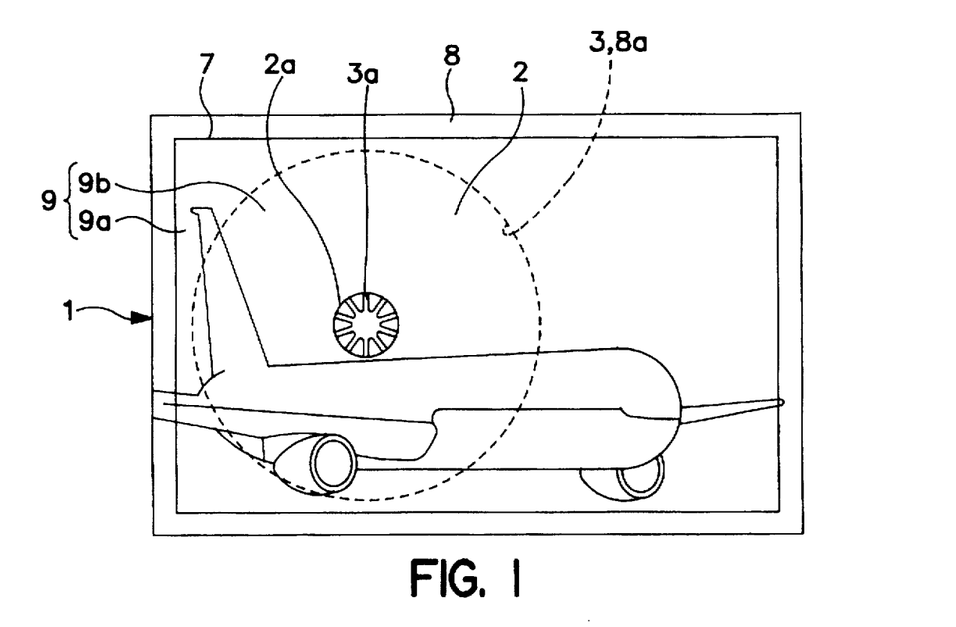
FIG. 1 is a plan view of the present invention.

As shown in FIG. 1, the board 1 is equivalent in size to an ordinary postal card. A coupling part 3, a shallow cylindrical space corresponding to the size of a storage disc 2, is mounted to the left of one side of the board 1. At the center of the coupling part 3 is a hooking means 3a to fix the disc firmly to the coupling part 3.

Figure 2:
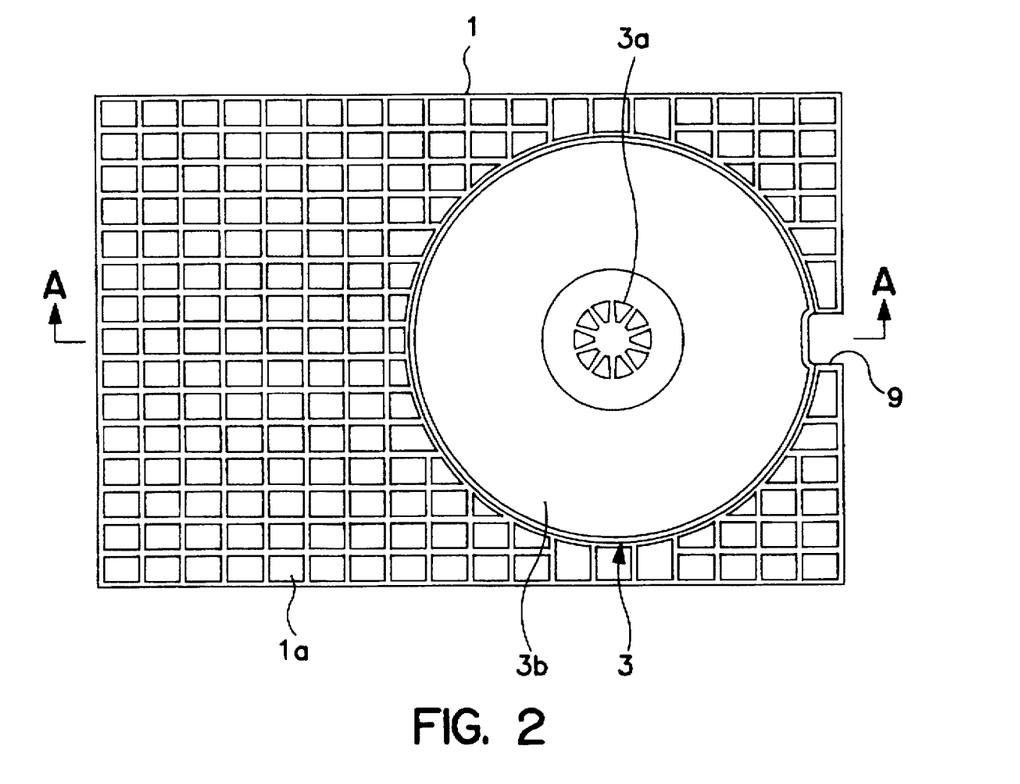
FIG. 2 is a plan view of a backside of the board shown in FIG. 1.
Figure 3:
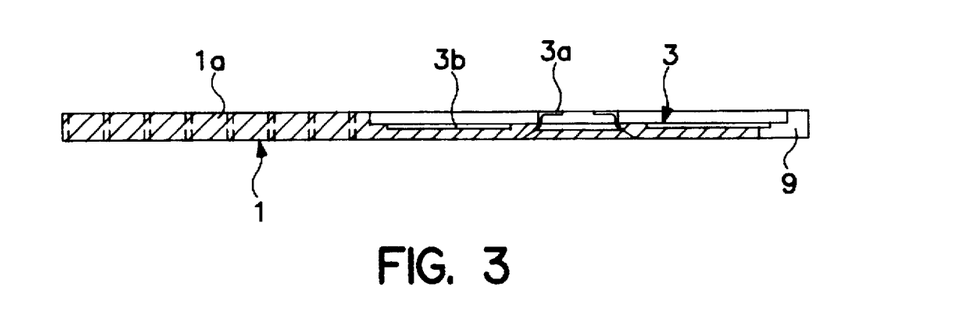
FIG. 3 is a cross-sectional view taken along line A—A in FIG. 2.

"The space corresponding to the size of a storage disc 2" in the above paragraph can be defined as a space which is slightly wider than the diameter of the storage disc 2 and deeper than the thickness of the disc 2. The coupling part 3 can be of the same depth. However, to protect the vulnerable memory storage area of the disc from dust in the coupling part 3, an even deeper stage corresponding to the memory storage area is mounted as shown in FIGS. 2 and 3.

A hooking means 3a is provided to fix a storage disc 2 into the coupling part 3 by hooking the spindle hole 2a. In this example, the hooking means 3a is raised from the bottom of the coupling part 3 so that it can hold the spindle hole 2a with enough pressure. It is composed of a plural number of picks, an upper part of which have hooks all pointing to the center.

After fixing the storage disc 2 into the coupling part 3 by hooking the spindle hole 2a, the disc stays so firmly on the board 1 that it will not move around inside the coupling part 3. In this case, the disc 2 can be positioned on the same level of the board 1 or slightly lower than the rest of the board 1.

The board 1 is provided with a cut 3d (FIG. 4) at the certain place along the periphery of the coupling part 3 to enable a fingertip to slip underneath the rim of the disc 2. By moving the finger upward while pushing down the hooking means 3a, the disc 2 can be removed from the coupling part 3 smoothly.

As shown in FIG. 2, a number of holes 1a are provided to form a lattice on the other side of the board with the coupling part 3. The method helps reinforce the board as well as reduce the total weight of the postal card and cost of materials.

Figure 4:
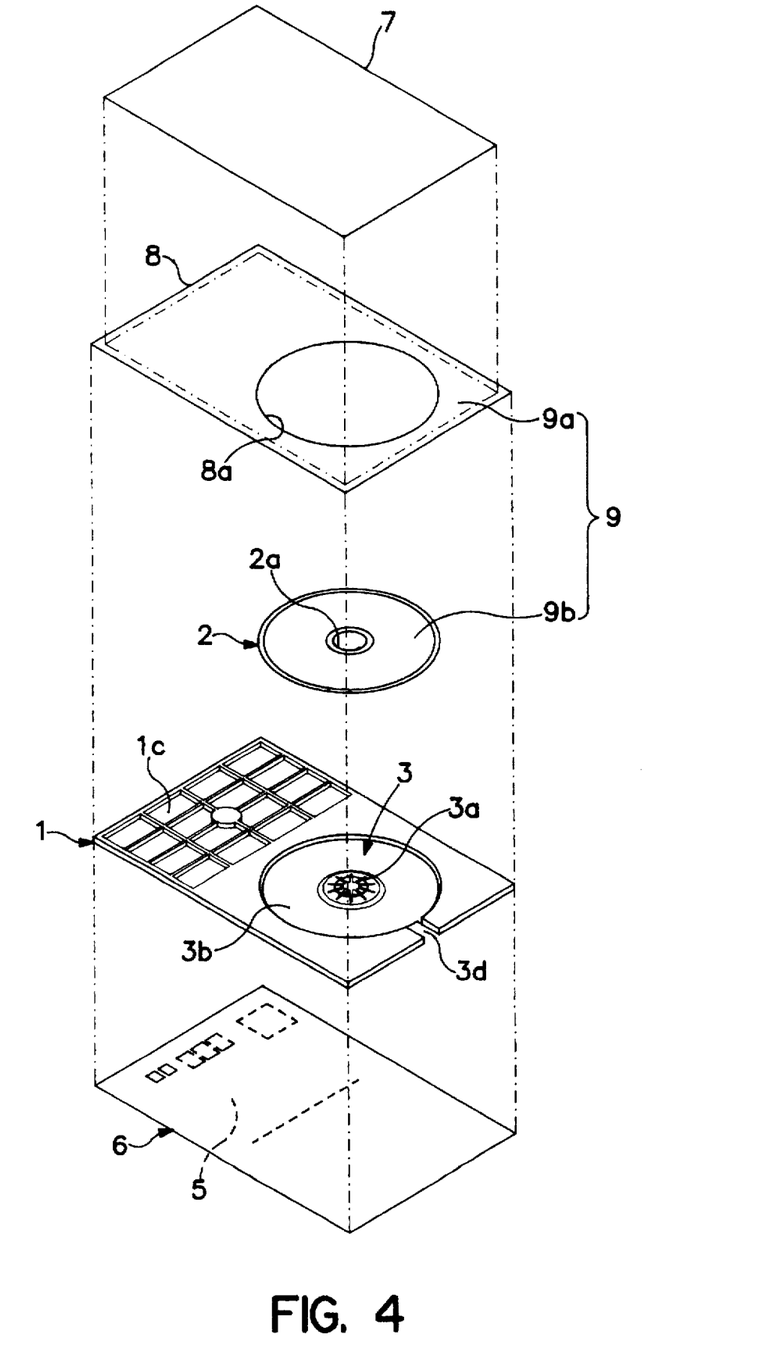
FIG. 4 is a perspective exploded view of the present invention.

As shown in FIGS. 1 and 4, an inner sheet 8 made of, for example, synthetic resins is pasted over one side of the board 1. A round hole 8a is formed in the inner sheet 8 corresponding to the coupling part 3. Then, a printing layer 9 is formed over the inner sheet 8 and the storage disc 2 fixed in the coupling part 3 so that a matching pattern appears.

This printing layer 9 encompasses two parts, namely, a printing layer 9a formed over the inner sheet 8, and a printing layer 9b formed on the back of the the memory storage area of the storage disc 2. A well-coordinated pattern formed on these two printing layers 9a and 9b can be seen through a transparent sealing sheet 7, which will be described later, and is likely to add an even upgraded aesthetic value.

Thus, the postal card would live up to the expectations of its recipient and give a favorable impression as he can recognize its contents from the pattern printed on the printing layer 9 as well as the storage disc 2 seen through the transparent sealing sheet 7.

As shown in FIGS. 1 and 4, a transparent stick-type sealing sheet 7 is adhered to the inner sheet 8 after the storage disc 2 is fixed into the coupling part 3 of the board 1. In this way, the storage disc 2 is completely sealed into the card and is not likely to fall off from the coupling part 3.

As described above, the storage disc 2 and the board 1 are designed to form an evenly flat surface, or sometimes the storage disc 2 is a little sunken in the board 1 when the disc 2 is fixed into the coupling part 3 via a hooking means 3a. Therefore, the surface of the sealing sheet 7 covering the board 1 is also flat, securing safe mailing of the storage disc 2 because the sealing sheet 7 is less likely to bump with other mailing objects during the delivery.

And the communication entry part 5 is printed on the outer surface of the back sheet 6, and then the sheet is pasted on the back side of the board 1.

In the communication entry part 5, various messages, including postal address, personal messages, description of the contents of the disc, and commercial message, may be either printed, stamped or hand written.

In addition to the ordinary communication messages, bar codes, symbols, signs and retail price used for the purposes of product control can also be printed on the back sheet 6.

A sender can write down the postal address in a variety of writing utensils, such as a ball point pen, a fountain pen and a Japanese calligraphy pen. He can also stamp or print postal address after he fixes a storage disc 2 into the coupling part 3 of the board 1 and pastes a sealing sheet 7 on it.

Since the sender can send this card in the form of a postal card, he doesn't have to stuff it into an envelop and can keep the postage to its minimum. Thus when sending a large number of storage discs, the present card is particularly deemed economical.

Figure 5:
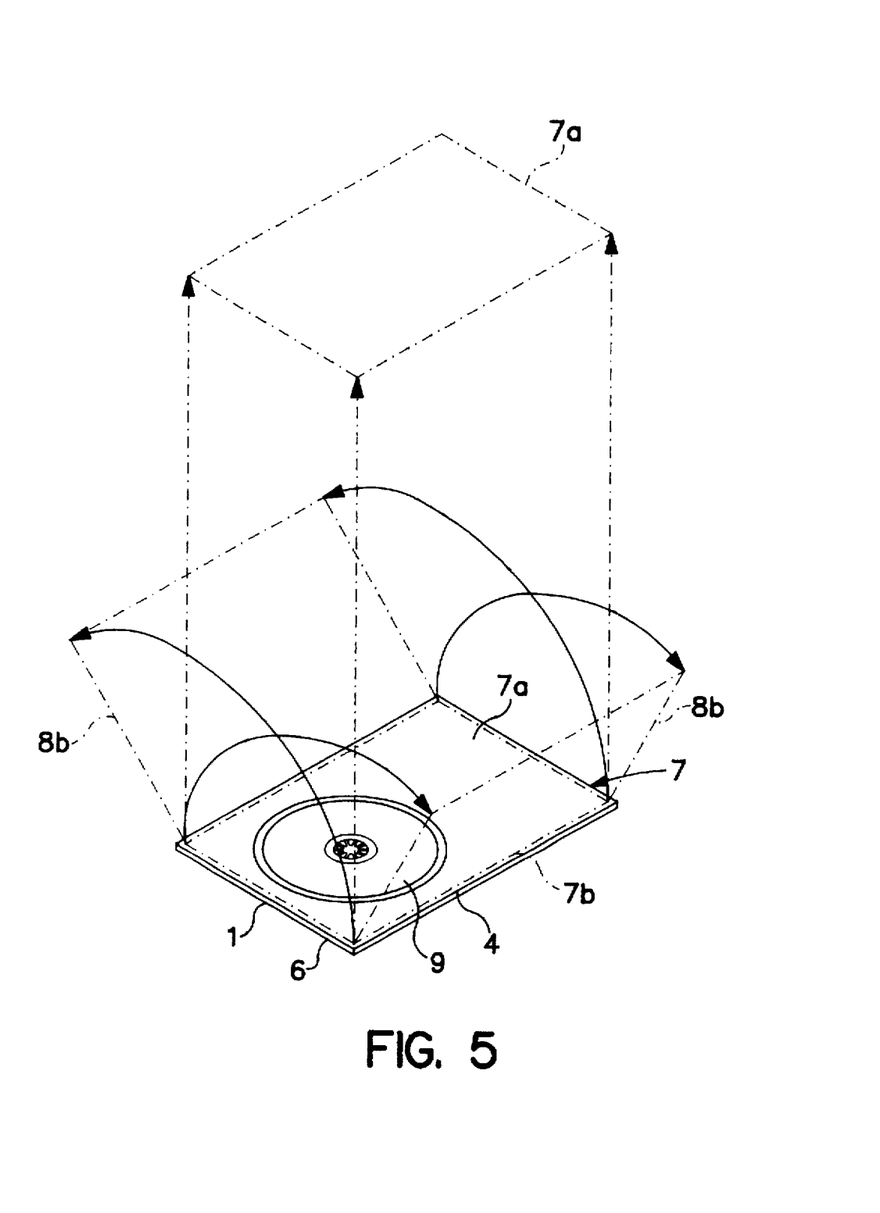
FIG. 5 is a perspective view of a preferred embodiment of the invention.
Figure 6:
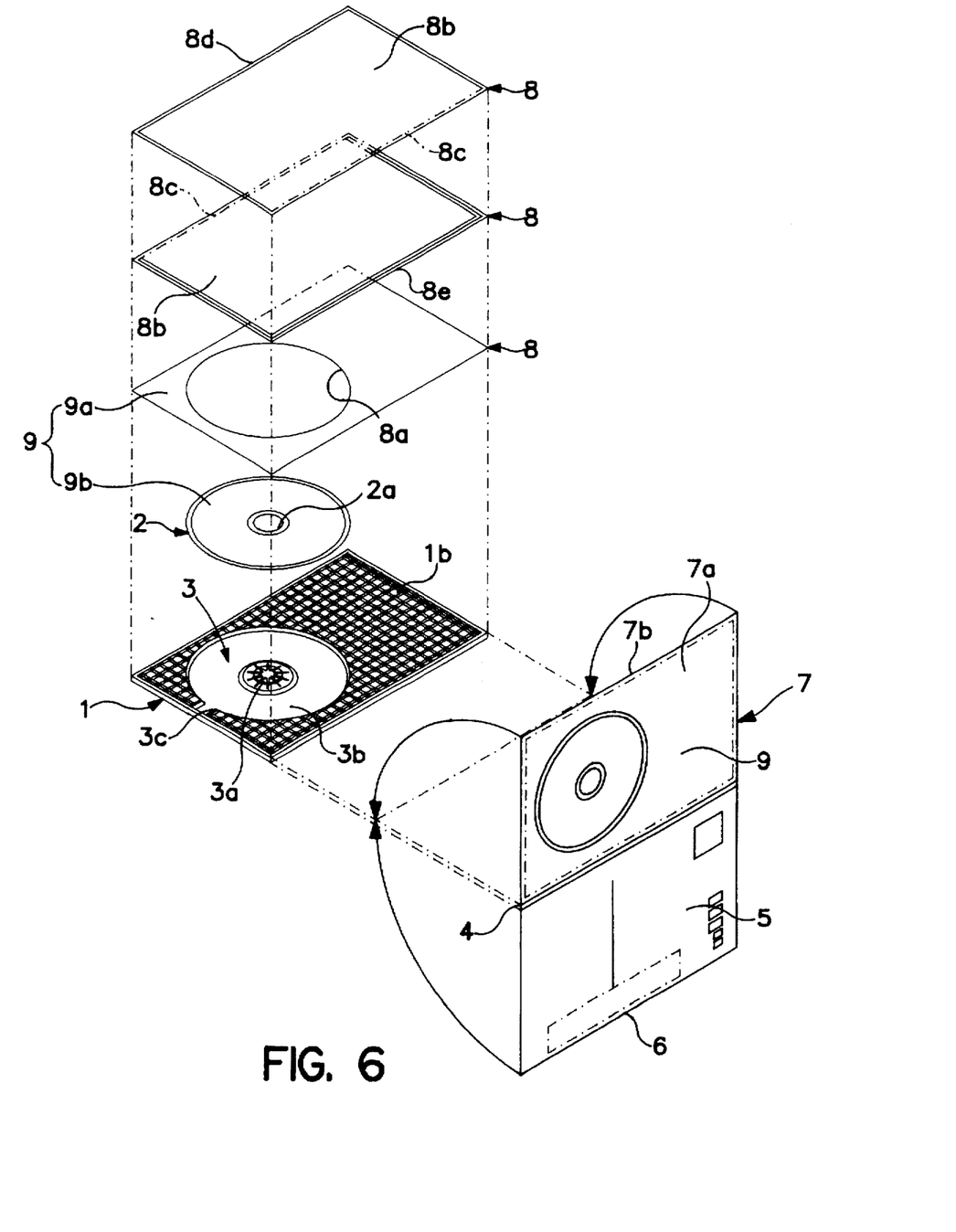
FIG. 6 is a perspective exploded view of a preferred embodiment of the invention.

FIG. 5 is a perspective view of a preferred embodiment of the invention, and FIG. 6 is a perspective exploded view of FIG. 5. In this embodiment, three paper inner sheets 8 are inserted between a sealing sheet 7 and a board 1.

Of the above three inner sheets 8, (see FIG. 6), the entire first inner sheet is glued to the board 1 directly. A printing layer 9a provided on this inner sheet 8 and a printing layer 9b provided on the storage disc 2 form a printing layer 9 to bring about a well-coordinated pattern.

The second inner sheet 8 covers over the first inner sheet 8. In this case, for example, only the rim of the second sheet can be adhered to the first sheet 8. An inner door 8b is created in the second sheet, having a folding line 8c along the one long side of this door and a groove 8e of specified width along the rest of the sides. By folding the inner door 8b on the folding line 8c, the inner door 8b opens. On both sides of this inner door 8b a pattern, names of a song, music, composer, arranger, player, song writer, singer, as well as messages, can be printed if necessary.

A well-coordinated pattern that matches the one on the print layer 9 of the the first inner sheet 8 can be printed on the back of the inner door 8b.

The third inner sheet 8 covers over the second inner sheet 8, and again only the rim of the third sheet can be adhered to the second sheet 8. An inner door 8b is created in the third sheet, having a folding line 8c along the one long side of the door and a groove 8e of specified width along the rest of the sides. By folding the inner door 8b on this folding line 8c, the inner door 8b opens. On both sides of this inner door 8b, a picture, names of a song, music, composer, arranger, player, song writer, singer, as well as messages, can be printed if necessary.

A well-coordinated picture that matches the one on the print layer 9 of the the second inner sheet 8 can be printed on the back of the inner door 8b.

The sealing sheet 7 spreads over the third inner sheet 8 and the rim of the sealing sheet can be adhered to the third sheet 8. An opening part 7a is created in the sealing sheet 7, with a break line 7b encircling around the part 7a.

On the surface of the sealing sheet 7 formed is a printing layer 9 with a pattern that matches the ones on the first inner sheet 8 and a storage disc 2.

After a storage disc 2 is fixed into a coupling part 3 provided on the board 1, on which the first and the third inner sheet 8 are adhered, the disc 2 is sealed into the card by a sealing sheet that seals the board 1.

In order to remove the enclosed storage disc 2, the break line 7b needs to be ripped. The recipient of the card can ascertain whether the data in the storage disc 2 is misused or not during the delivery, by checking the condition of the break line 7b.

In other words, if the break line 7b retains its original state, the recipient of the card can assume that no data is stolen during the delivery. On the other hand, if the break line 7b is cut open, the recipient can take necessary action against possible misappropriation of the data.

The card would live up to the expectations of the recipient and give favorable impression as he can recognize what's in the card by looking at the design of the printing layer 9 formed on the sealing sheet 7.

In place of the cut 3d, a concave 3c continuous to the coupling part 3 is formed on one side of the board 1. By slipping a fingertip in this concave 3c and lifting the storage disc 2 upward while pushing down the center of the hooking means 3a, the picks bend toward the center and the disc 2 is detached from the coupling part 3.

A number of concaves 1b can be formed on the board 1, except for the area the coupling part 3 and its vicinity are located. On the flat, back side of the board, a back sheet 6 is adhered easily. These concaves 1b form a lattice on the board 1 to retain enough strength as well to reduce both the weight and cost of materials.

The back sheet 6 and the sealing sheet 7 are connected by a back 4, one longer side of the both sheets. These sheets as well as the back 4 are glued to the board 1, for example. These sheets and the back 4 are made of inexpensive paper, so the cost of the materials can be kept lower compared to the one mentioned in the first embodiment in which a transparent stick-type sheet is used.

Further descriptions on the structure and function of this embodiment are eliminated because they are equivalent to the one mentioned above.

Figure 7:
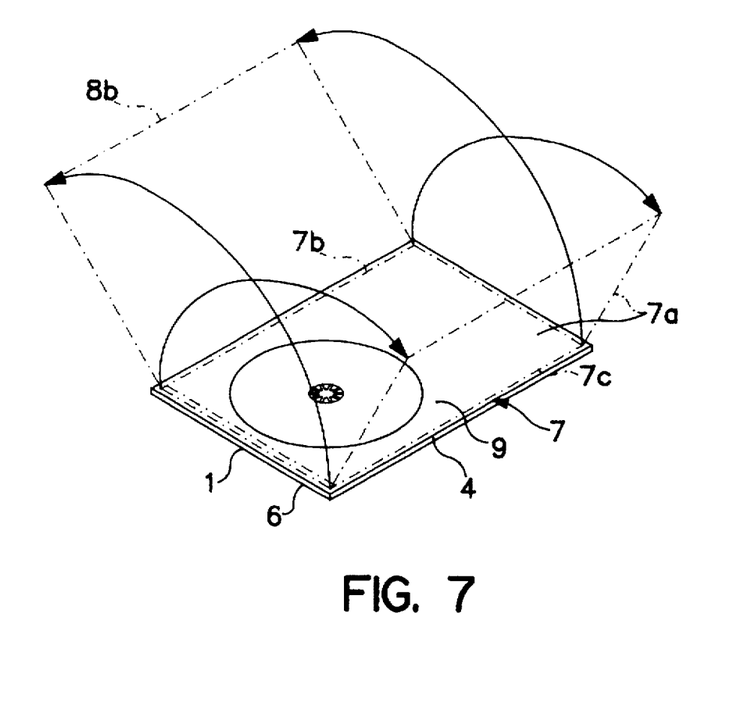
FIG. 7 is a perspective view of an alternative preferred embodiment of the invention.

FIG. 7 is a perspective view of an alternative preferred embodiment of the invention.

Figure 8:
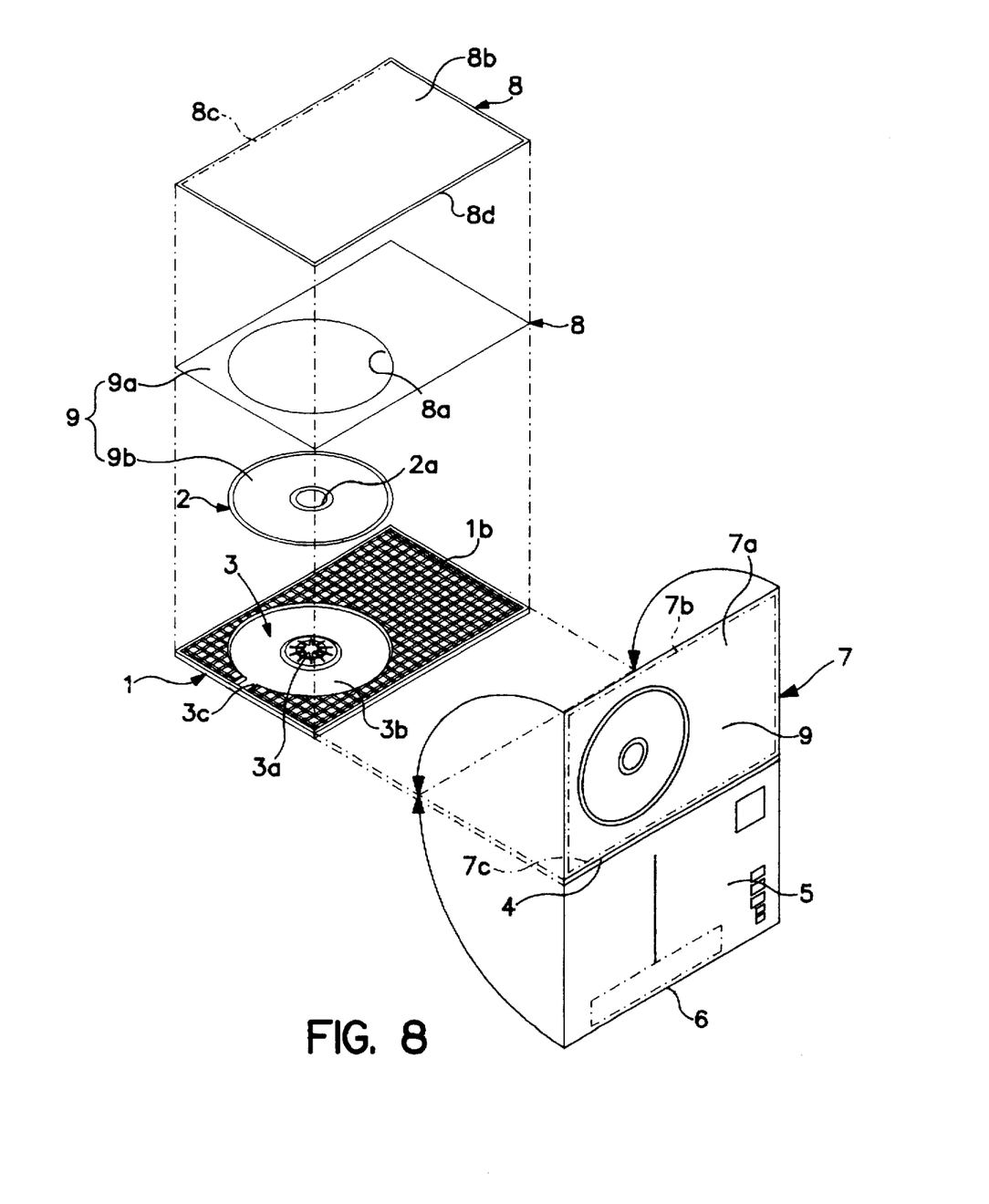
FIG. 8 is a perspective exploded view of an alternative preferred embodiment of the invention.

FIG. 8 is a perspective exploded view of an alternative preferred embodiment of the invention, in which two inner sheets 8 are inserted between the sealing sheet 7 and the board 1.

These two inner sheets 8 are adhered to the board in order, following the ones mentioned in the previous embodiment shown in FIGS. 5 and 6.

In this embodiment, a sealing sheet 7 spreads over the second inner sheet 8 and only the rim of the sheet 7 is glued to the second inner sheet 8. An opening part 7a which is formed on the sealing sheet 7 has a folding line 7c along the one long side and a break line 7b along the rest of the sides.

After a storage disc 2 is fixed into a coupling part 3 provided on the board 1, on which the first and the second inner sheet 8 are adhered, the disc 2 is sealed into the card by a sealing sheet that seals the board 1.

The recipient of the card can remove the enclosed storage disc 2 after he rips up the break line 7b and folds the opening part 7a on the folding line 7c. The disc 2 once detached can be put back to its original place, i.e. coupling part 3.

On this opening part 7a, various information, including names of song writer, arranger, player and singer can be printed along with a picture.

Further descriptions of the structure and function of this embodiment are eliminated because they are equivalent to the one mentioned above.

Figure 9:
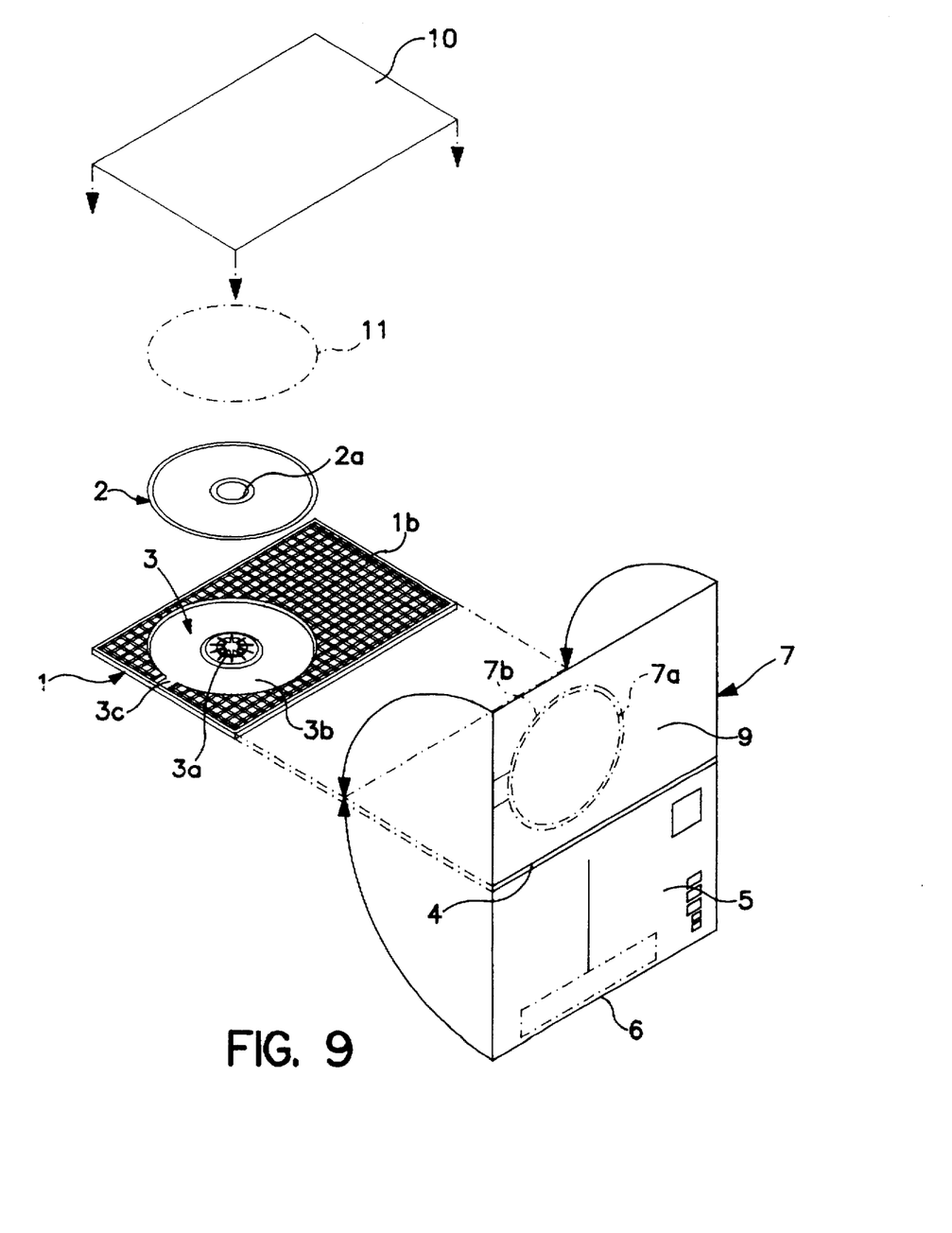
FIG. 9 is a perspective exploded view of yet another alternative preferred embodiment of the invention.

A sealing sheet 7 is secured where the disc 2 is fixed into the coupling part 3. A break line 7b encircling the entire rim of the disc 2 is provided on the sealing sheet. By removing an opening part 7a along this break line 7b, the disc 2 can be removed. It is yet another option to place a piece of paper 11 containing some kind of information, such as a song sheet, on the disc 2 after it is fixed into the coupling part 3, and then to seal both disc 2 and the piece of paper 11 with a sealing sheet 7.

However, in the above-mentioned case the disc 2 is likely to be exposed when the opening part 7a is removed. To prevent unnecessary exposure of the disc 2, a cover sheet 10 can be used to cover the sealing sheet 7. This cover sheet 10 is adhered to the sealing sheet 7 by using static electricity so that it will not come off easily unless an external force is applied.

Lastly the content of the storage disc 2 is not limited to music. Any data that can be stored in the disc is fine.

As may be obvious in the above descriptions, the present invention excels in that it helps cut down on postage with a card that enables a person to to send a storage disc in the form of a postal card. This is especially cost efficient in sending them in a large number.

At the same time, it enables a person to mail a storage disc of specified thickness safely without damaging the sealing sheet that covers the disc.

In addition, the recipient can recognize the enclosed storage disc without opening it, and is likely to be satisfied with what he actually receives. Patterns printed on the board and the storage disc are designed to match perfectly to bring about a uniform picture. It is expected to enhance the market value of the product because it gives a favorable impression on the part of the receiver.

Furthermore, the scope of its application is not limited to a postal card. However it is used, the following two advantages are still featured: (1) prevent the storage disc from being lost in the mail and (2) the enclosed storage disc can be recognized from outside.

The foregoing relates to preferred exemplary embodiments of the invention, it being understood that other variants and embodiments thereof are possible within the spirit and scope of the invention, the latter being defined by the appended claims.

I claim:

1. A card for mailing a storage disc, comprising:

a board of a particular size and thickness, a coupling part, a shallow cylindrical space corresponding to the size and shape of the storage disc on one side of the board, a communication entry part, a space to write messages on an opposite side of the board, a sealing sheet which covers one side of said board after the storage disc is fixed in said coupling part, and the entire rim of which is adhered to said board, and an opening part is formed in said sealing sheet corresponding to said coupling part and said opening part is encircled by a break line along which the opening is sealed in order to remove the disc.

2. A card as described in claim 1, wherein:

a hooking means is mounted at a center of said coupling part to hook said storage disc.

3. A card as described in claim 1, wherein:

an opening is provided on said board continuous to said coupling part formed on a surface of said board for a fingertip to slip into during removal of said disc.

4. A card as described in claim 2, wherein:

an opening is provided on said board continuous to said coupling part formed on a surface of said board for a fingertip to slip into during removal of said disc.

5. A card as described in claim 1, wherein:

a plurality of apertures are formed in said board except where said coupling part is located, for the purpose of weight reduction.

6. A card as described in claim 3, wherein:

a plurality of apertures are formed in said board except where said coupling part is located, for the purpose of weight reduction.

7. A card as described in claim 1 wherein:

a rim of said sealing sheet is adhered to said board by way of a fixing means, with a break line encircling the entire rim of said sealing sheet.

8. A card as described in claim 1, wherein:

a rim of said sealing sheet is adhered to said board by way of a fixing means, with a folding line formed along one side of said sealing sheet, and a break line is linked with opposite ends of said folding line, formed along three sides of said sealing sheet.

9. A card as described in claim 1, wherein:

said sealing sheet including its entire rim and excluding the area corresponding to said coupling part, is adhered to the board by a fixing means, with a break line encircling the entire rim of said coupling part.

10. A card as described in claim 5, wherein:

said sealing sheet including its entire rim and excluding the area corresponding to said coupling part, is adhered to the board by a fixing means, with a break line encircling the entire rim of said coupling part.

11. A card as described in claim 1, wherein:

said sealing sheet is adhered to the board by way of a sticking means for easily peeling off the sheet.

12. A card as described in claim 5, wherein:

said sealing sheet is adhered to the board by way of a sticking means for easily peeling off the sheet.

13. A card as described in claim 1, wherein:

an inner sheet is sandwiched between said sealing sheet and said board.

14. A card as described in claim 11, wherein:

an inner sheet is sandwiched between said sealing sheet and said board.

15. A card as described in claim 12, wherein:

an inner sheet is sandwiched between said sealing sheet and said board.

* * * * *